United States Patent
Beaudoin (10) Patent No.: US 8,646,559 B2
(45) Date of Patent: Feb. 11, 2014

(54) ICE-PARTICLE SPRAY GENERATING DEVICE FOR SNOW VEHICLES

(76) Inventor: Denis Beaudoin, Drummondville (CA)

(*) Notice: Subject to any disclaimer, the term of this patent is extended or adjusted under 35 U.S.C. 154(b) by 479 days.

(21) Appl. No.: 13/084,038

(22) Filed: Apr. 11, 2011

(65) Prior Publication Data

US 2012/0255981 A1   Oct. 11, 2012

(51) Int. Cl.
*B62M 29/02* (2006.01)
*E01H 5/12* (2006.01)

(52) U.S. Cl.
USPC ............... 180/190; 280/900; 37/219

(58) Field of Classification Search
USPC ............ 180/190; 280/900, 809; 37/219, 220, 37/221, 231
See application file for complete search history.

(56) References Cited

U.S. PATENT DOCUMENTS

| | | | | | |
|---|---|---|---|---|---|
| 2,067,405 | A | * | 1/1937 | Mayne | 57/7 |
| 2,118,103 | A | * | 5/1938 | Oeding | 174/145 |
| RE22,730 | E | * | 3/1946 | Myers | 305/167 |
| 3,145,789 | A | * | 8/1964 | Lawry | 175/386 |
| 3,242,691 | A | * | 3/1966 | Robinson et al. | 464/53 |
| 3,778,994 | A | * | 12/1973 | Humphries | 57/214 |
| 3,800,522 | A | * | 4/1974 | Hughes et al. | 57/215 |
| 3,844,601 | A | * | 10/1974 | Rochester, Jr. | 294/82.14 |
| 3,897,839 | A | * | 8/1975 | Brisebois | 180/190 |
| 4,036,320 | A | * | 7/1977 | Rabehl | 180/9.1 |
| 4,076,089 | A | * | 2/1978 | Sanders | 180/190 |
| 5,277,266 | A | * | 1/1994 | Robinson | 180/190 |
| 5,540,004 | A | * | 7/1996 | Patterson et al. | 37/244 |
| 6,267,679 | B1 | * | 7/2001 | Romano | 464/58 |
| 7,527,116 | B2 | * | 5/2009 | Aoshima | 180/190 |
| 7,918,298 | B2 | * | 4/2011 | Cook | 180/190 |

\* cited by examiner

*Primary Examiner* — Ruth Ilan
*Assistant Examiner* — Daniel Yeagley
(74) *Attorney, Agent, or Firm* — Brouillette & Partners; Robert Brouillette; Francois Cartier (57) ABSTRACT

An ice-particle spray generating device for use on snow vehicles is disclosed. The present invention provides an adapter having a locking device to prevent the connecting means of the ice-particle spray generating device to loosen when the snow vehicle is travelling.

15 Claims, 6 Drawing Sheets

ICE-PARTICLE SPRAY GENERATING DEVICE FOR SNOW VEHICLES

CROSS-REFERENCE TO RELATED APPLICATIONS

There are no cross-related applications.

FIELD OF THE INVENTION

The present invention generally relates to ice-particle spray generating devices such as are employed on snow vehicles, namely snowmobiles, to both cool and lubricate vital components during operation.

BACKGROUND OF THE INVENTION

Snowmobile operation requires that a sufficient snow or ice-particle spray be generated to effectively cool the heat exchanger, the track and the slide rail. This snow or ice spray also acts to lubricate the frictional contact points between the slide rails of the rear track suspension and the track itself. Conventionally, the above-described ice spray is generated by the rubbing action of the rotating drive track's traction lugs as they frictionally engage the terrain during operation. The problem with such cooling and lubricating means is that when the snow is hard packed or icy, there is not enough loose snow to be thrown onto the parts that need cooling and lubricating.

One attempt at a solution to this problem is proposed in the patent literature (Cook, U.S. Publication No. US 2008/0290728, November 2008) in which Cook provides a bi-directional ice-particle spray generating device. One of the experienced problems with this device is that the connection means (a bolt thread in the first end cap) has a tendency to loosen during use because of the impacts of the snowmobile. A first consequence is that the device won't apply a sufficient force on the ground to generate enough ice particles since it is not properly attached to the slide rail. Another consequence is that the device may eventually fall from the slide rail when the bolt is completely unscrewed from the first end cap.

When the snowmobile is in use, the spray generating particle is subject to many impacts. Typically, the first end cap is made from steel and the slide rail is made from aluminum that is softer than steel. Since the first end cap is attached to the slide rail, it will transmit these impacts to the slide rail that will eventually become embossed or deformed. On the long term, these impacts and continuous pressure can break locally the slide rail.

SUMMARY OF THE INVENTION

The present invention is generally providing an ice-particle spray generating device for attachment to a snow vehicle, the ice-particle spray generating device comprising an adapter comprising a first opening and a second opening; a resilient portion; a first end cap having a first and a second extremity, the second extremity being connected to a first end of the resilient portion, the first extremity of the first end cap being configured to permit threaded attachment to the snow vehicle, wherein the first extremity of the first end cap is received by the first opening; a second end cap connected to a second end of the resilient portion; and a wear point engaging the second end cap, the wear point adapted to frictionally engage the terrain to generate an ice spray during travel, wherein the adapter comprises a locking device to prevent rotation of the first end cap into the first opening.

The present invention is also providing an ice-particle spray generating device for attachment to a snow vehicle, the ice-particle spray generating device comprising an adapter comprising a first opening and a second opening; a resilient portion; a first end cap having a first and a second extremity, the second extremity being connected to a first end of the resilient portion, the first extremity of the first end cap being configured to permit threaded attachment to the snow vehicle, and wherein the first extremity of the first end cap is received by the first opening; a locking device, wherein the locking device comprises a first profile on the first opening configured to match a corresponding second profile on the first extremity of the first end cap; a second end cap connected to a second end of the resilient portion; and a wear point engaging the second end cap, the wear point adapted to frictionally engage the terrain to generate an ice spray during travel, wherein the adapter comprises a locking device to prevent rotation of the first end cap into the first opening.

The present invention is also providing an adapter for use with an ice-particle spray generating device for attachment to a snow vehicle, the ice-particle spray generating device comprising a resilient portion, a first end cap having a first and a second extremity, the second extremity of the first end cap being connected to a first end of the resilient portion, the first extremity of the first end cap being configured to permit threaded attachment to the snow vehicle, a second end cap connected to a second end of the resilient portion, a wear point engaging the second end cap, the wear point adapted to frictionally engage the terrain to generate an ice spray during travel, the adapter comprising a first opening and a first opening, wherein the first extremity of the first end cap is received by the first opening; a locking device, wherein the locking device comprises a first profile on the first opening configured to match a corresponding second profile on the first extremity of the first end cap to prevent rotation of the first end cap into the first opening.

The present invention discloses an ice-particle spray generating device that is connected to a slide rail of a snowmobile. The ice-particle spray generating device comprises a resilient or flexible portion, a first end cap connected to a first extremity of the resilient portion and a second end cap that is connected to a second extremity of the resilient portion. The first end cap is preferably bent at a 45 degree angle. The first end cap is configured to be attached to the slide rail of a snowmobile. More particularly, the first end cap comprises a threaded opening for attachment to the slide rail of a snowmobile by a threaded bolt. The resilient portion extends from the slide rail and downward at an angle substantially perpendicular to the slide rail. A replaceable wear point is connected to the second end cap. More particularly, the second end cap comprises a threaded opening for attachment of the replaceable wear point via a threaded rod extending from the replaceable wear point. The replaceable wear point frictionally engages the terrain to generate an ice spray during travel. The use of flexible portion and its inherent flexible properties in the design allows for 360 degree repetitious flexing without damage. This device may be employed singly or in multiple numbers on a snowmobile to effectively cool and lubricate vital components.

The present invention provides an adapter configured to receive the first end cap and configured to prevent the rotation of the first end cap. The adapter comprises a first opening receiving the first end cap, and the shape of the first opening is corresponding to the profile of the first end cap. The particular shape of the first opening and of the profile of the first end cap act as a locking device, thus preventing the rotation of the first end cap. This prevents the loosening of the threaded bolt attaching the ice-particle spray generating device.

By using the adapter, the forces transmitted by the first end cap to the slide rail are distributed on a greater surface area, i.e. the area of the adapter that is greater than the area of the extremity of the first end cap. Normally, without the adapter, the forces are transmitted to the slide rail on an area corresponding to the end of the first end cap.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel ice-particle spray generating device for snow vehicles will be described hereinafter. Although the invention is described in terms of specific illustrative embodiment(s), it is to be understood that the embodiment(s) described herein are by way of example only and that the scope of the invention is not intended to be limited thereby.

Figure 1:
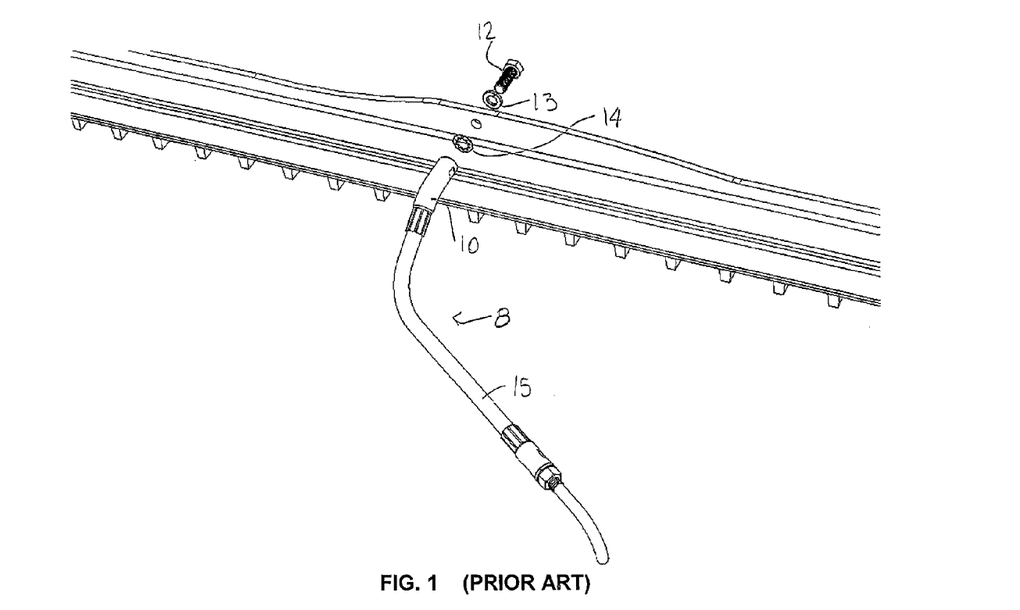
FIG. 1 is a perspective view showing a ice-particle spray generating device of prior art.

FIG. 1 shows an ice-particle spray generating device 8 of prior art, that is connected to a slide rail 5 of a snowmobile. The ice-particle spray generating device 8 generally comprises a first end cap 10, a resilient portion 15, a second end cap 20 and a wear point 25. The spray generating device 8 is connected to the slide rail 5 by using a bolt 12, a split washer 13 and a lock washer 14. The first end cap 10 has a circular profile.

Figure 2:
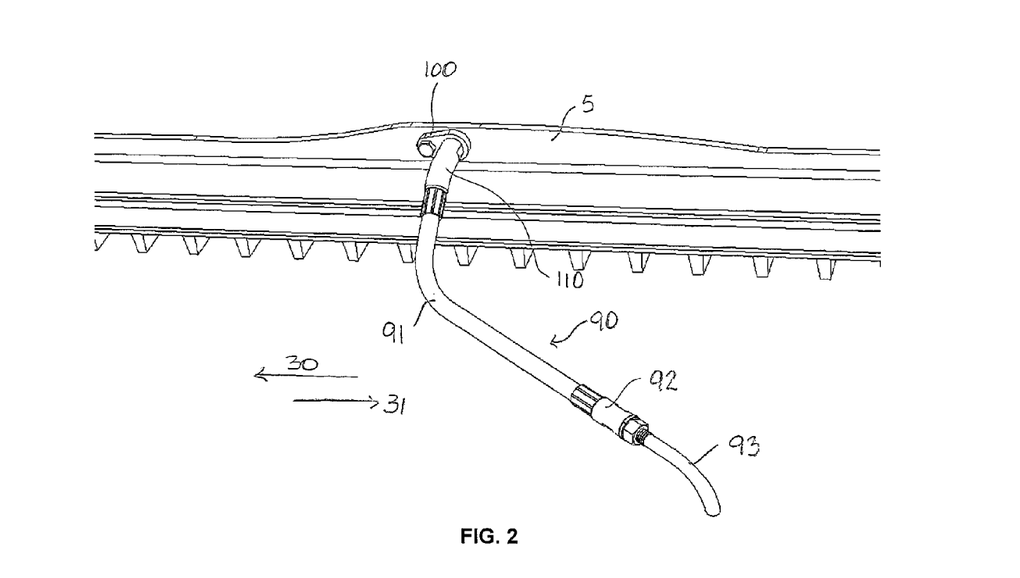
FIG. 2 is a perspective view showing the present invention as mounted on a left slide rail of a snowmobile.
Figure 3:
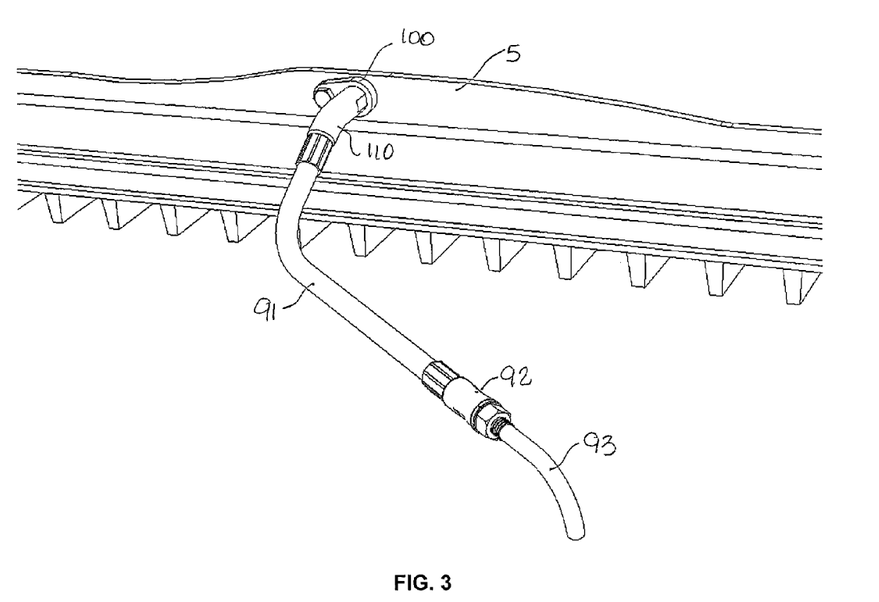
FIG. 3 is a perspective view of the invention shown in FIG. 2.
Figure 4:
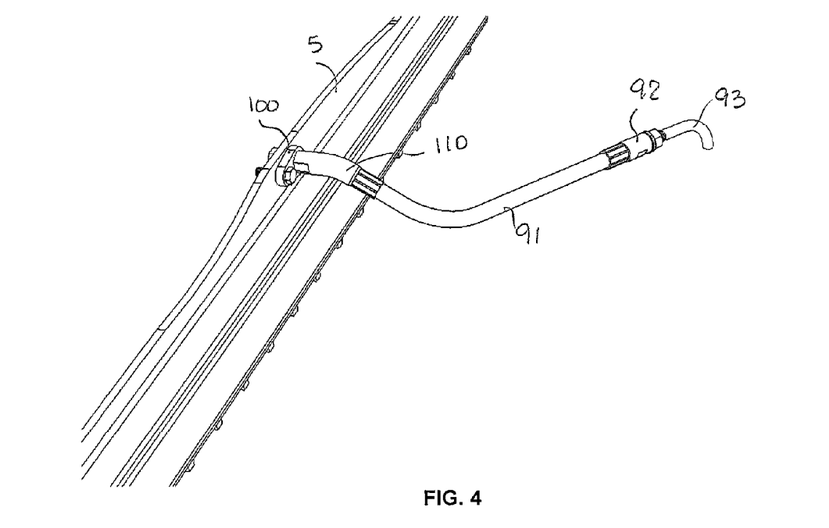
FIG. 4 is another perspective view of the invention shown in FIG. 2.
Figure 5:
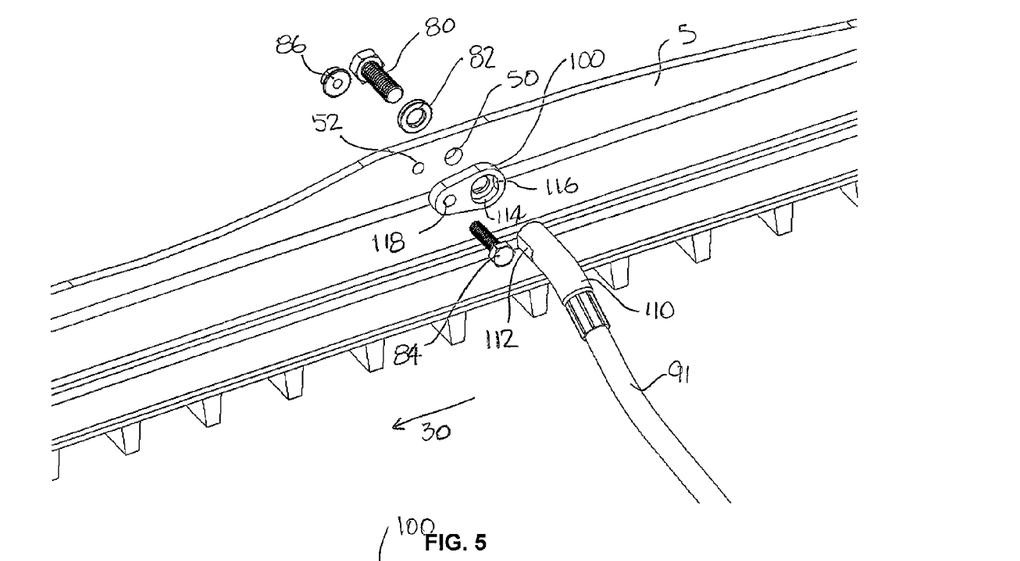
FIG. 5 is an exploded view of the invention shown in FIG. 2.
Figure 6:
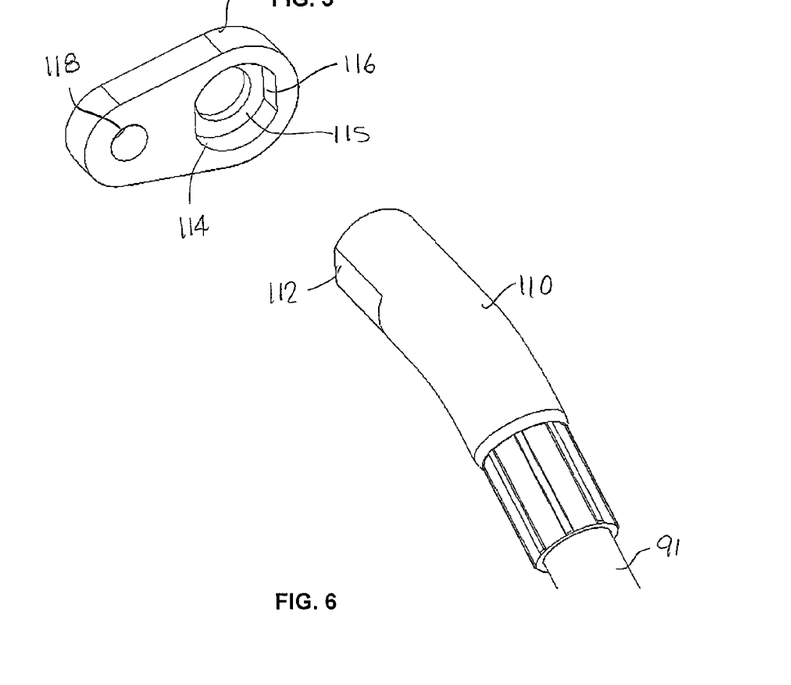
FIG. 6 is an exploded closed-up view of a first embodiment of the present invention.

The invention is employed on a snowmobile with a drive track that rotates around the slide-rail 5 that frictionally engages the terrain to propel the snowmobile in a forward direction 30 during normal operation. The invention is mounted to the slide rail 5 by the first end cap 110 and acts in a spring-like manner to frictionally engage the terrain during forward direction 30 travel. When the wear point 93 of the invention frictionally engages the terrain, the resilient portion 91, having a spring-like quality, which is attached to the wear point 93 by second end cap 92, is caused to bend in a resisting manner to a working position parallel to slide rail 5. The resisting action of the invention creates downward and outward pressure on the wear point 93 against the terrain, which then generates an ice spray which is directed into the drive track of the snowmobile. The invention may optionally be employed on the steering ski of a snowmobile in similar fashion as employed on the slide-rail. In this application, ice spray is directed into the rotating drive track by the momentum of the snowmobile during forward direction travel.

When the snowmobile is operated in reverse direction 31, the wear point 93 catches in the terrain and causes itself and the resilient portion 91 to flip-upside down, thus negating frictional contact with the terrain and allowing the ice-particle spray generating device to slide in this position until normal forward travel is resumed.

In a preferred embodiment, the first end cap 110, being bolted securely to the slide rail 5, is attached by mechanically crimped means to the resilient portion 91, and is also attached by mechanically crimped means to the second end cap 92. Threaded into the second end cap 92 is the replaceable wear point 93.

Generally speaking, the present invention provides an adapter having a first opening with a first profile that is configured to mate with the second profile of the first end cap. Since the first profile and the second profile closely mate together, the first end cap is locked in the first opening, i.e. it cannot rotates in the first opening of the adapter.

FIG. 2 illustrates a first embodiment of the present invention. The invention comprises an adapter 100 configured to receive the first end cap 110. The shape of the first end cap 110 is configured to mate the first opening 114 of the adapter 100. The first end cap 110 profile is partially circular and comprises two flat portions 116 engaging the flat portions 112 of the adapter 100. The extremity of the first end cap 110 comprises a threaded opening configured to receive the first bolt 80 passing through the first opening 50 in the slide rail. A split washer 82 is preferably used to secure the connection.

The adapter 100 comprise a second opening 118 configured to received the second bolt 84 that is secured with the serrated nut 86 into the second opening 52 in the slide rail. This second attachment prevents the ice-particle spray generating device to rotate when the snow vehicle is travelling, thus preventing it to loosen and eventually fall from the snow vehicle. The adapter 100 is preferably installed with the first opening directed toward the rearward of the snow vehicle so that the rotation forces are taken principally by the second bolt 84. The adapter 100 is preferably installed parallely (if a line is traced from the first opening 114 to the second opening 118) to the slide rail as shown in FIGS. 2 to 5. It is to be noted that the adapter could be installed in a non parallel way if there are obstacles on the slide rail.

In a preferred embodiment, the adapter 100 comprises a shoulder 115 on which the extremity of the first end cap 110 abuts. One of the problem in prior art is that the slide rail is embossed or deformed by the pressure exerted by the extremity of the first end cap. This problem is minimized with the use of the present invention since the contact area between the ice-particle spray generating device and the slide rail is increased, thus decreasing the pressure exerted on the slide rail. The shoulder 115 prevents the extremity of the first end cap 110 to be in direct contact with the slide rail 5.

Figure 7:
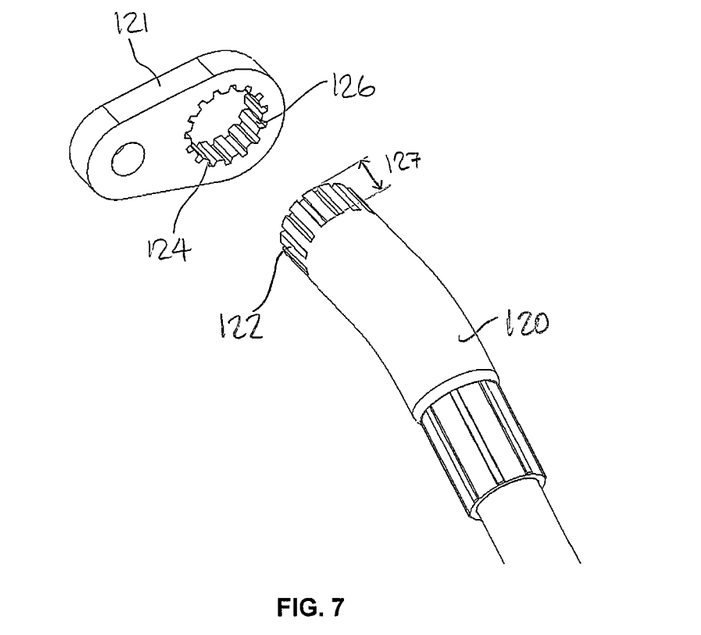
FIG. 7 is an exploded closed-up view of a second embodiment of the present invention.

FIG. 7 shows a second embodiment of the present invention. The first end cap 120 comprises the spline 122. The opening 124 of the adapter 121 comprises the spline 126 configured to receive the spline 122. This allows a better adjustment of the angular position of the first end cap 120 in the opening 124. This configuration provides a better resistance to the moment induced in the first end cap 120. A shoulder may be added to prevent the first end cap 120 to contact the slide rail 5. Alternatively, the first end cap 120 is prevented from contacting the surface of the slide rail by adjusting the length 127 of the spline 122.

Figure 8:
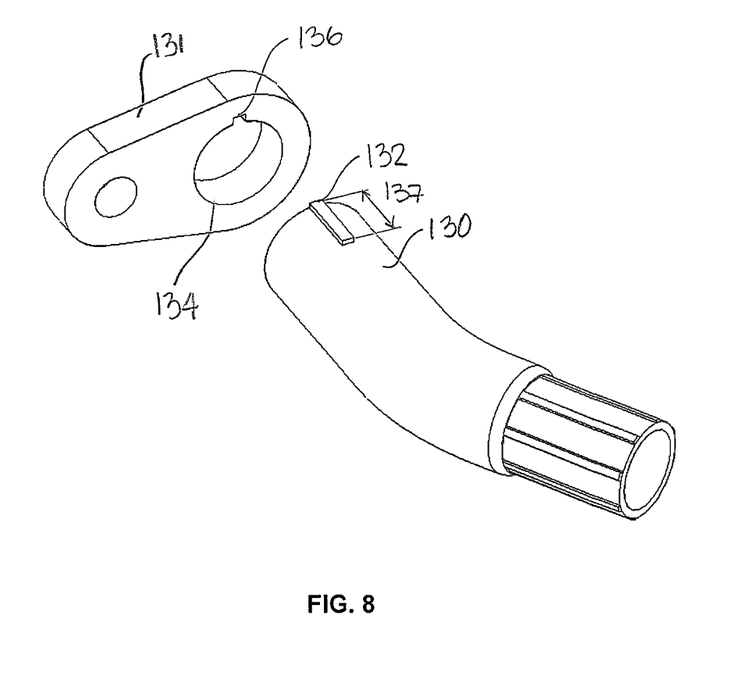
FIG. 8 is an exploded closed-up view of a third embodiment of the present invention.

FIG. 8 shows another embodiment of the present invention. The first end cap 130 comprises a key 132. The opening 134 of the adapter 131 comprises a keyseat 136 configured to receive the key 132. It should be understood that a plurality of key and keyseat could be provided. A shoulder may be added to the adapter 131 to prevent the first end cap 130 to contact the slide rail 5. Alternatively, the first end cap 130 is prevented from contacting the surface of the slide rail by adjusting the length 137 of the key 132 and the length of the keyseat 136.

Figure 9:
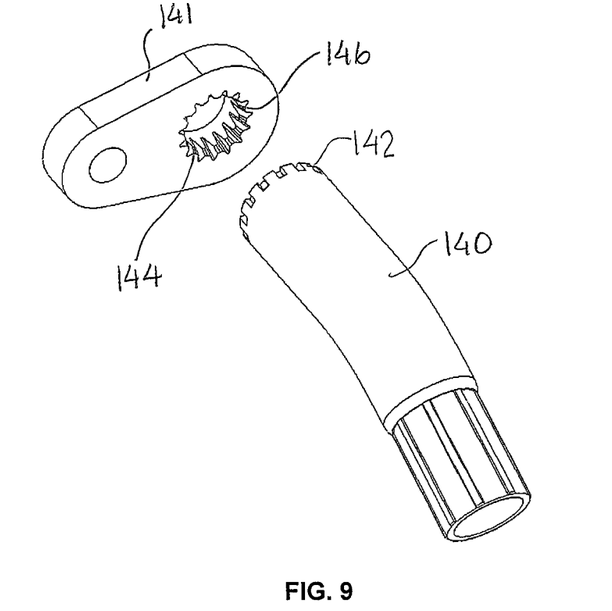
FIG. 9 is an exploded closed-up view of a fourth embodiment of the present invention.
Figure 10:
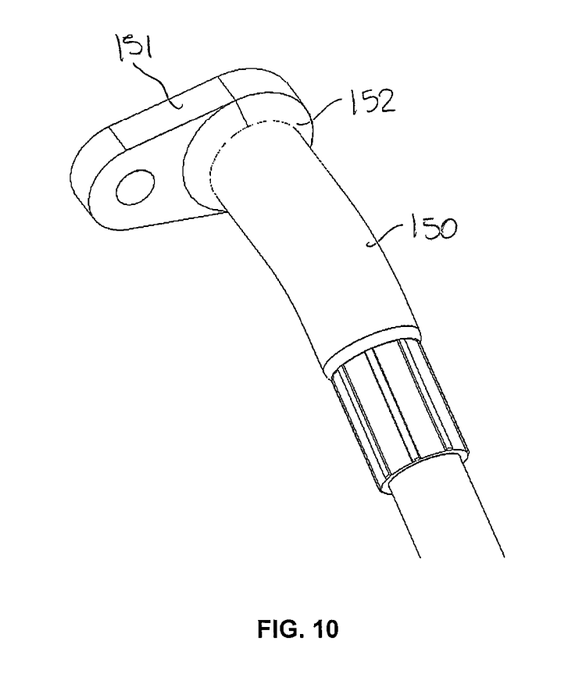
FIG. 10 is an exploded closed-up view of a fifth embodiment of the present invention.

FIG. 9 shows another embodiment of the present invention. The first end cap 140 comprises a conical spline 142. The opening 144 of the adapter 141 comprises corresponding conical spline 136 configured to receive the conical spline 142. This configuration prevents the first end cap 130 to contact the slide rail 5.

FIG. 9 shows another embodiment of the present invention. The first end cap 150 is welded 152 to the adapter 151.

Figure 11:
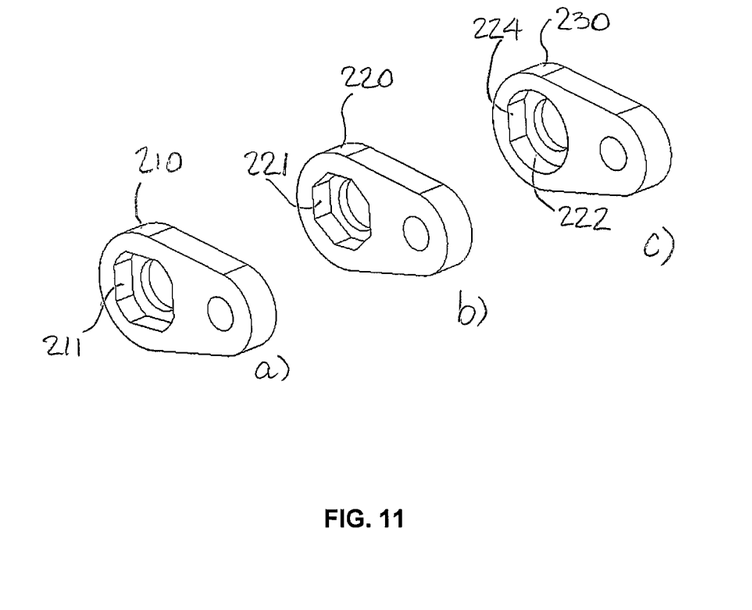
FIG. 11a to 11c are perspective view showing other embodiments for the adapter according to the present invention.

FIGS. 11*a* to 11*c* show other embodiments of the adapter. In FIG. 11*a*, the opening 211 of the adapter 210 is formed by a plurality of flat portions. In FIG. 11*b*, the opening 221 of the adapter 220 is octagonal. In FIG. 11*c*, the opening 222 is partially circular and comprises one flat portion 224.

The first end cap can be made from a tubular element or a plain element.

The first end cap is preferably made from steel in a preferred embodiment. Other suitable material could be polymer or composite, aluminum.

The adapter is preferably made from steel in a preferred embodiment. Other suitable material could be polymer or composite, aluminum.

Figure 12:
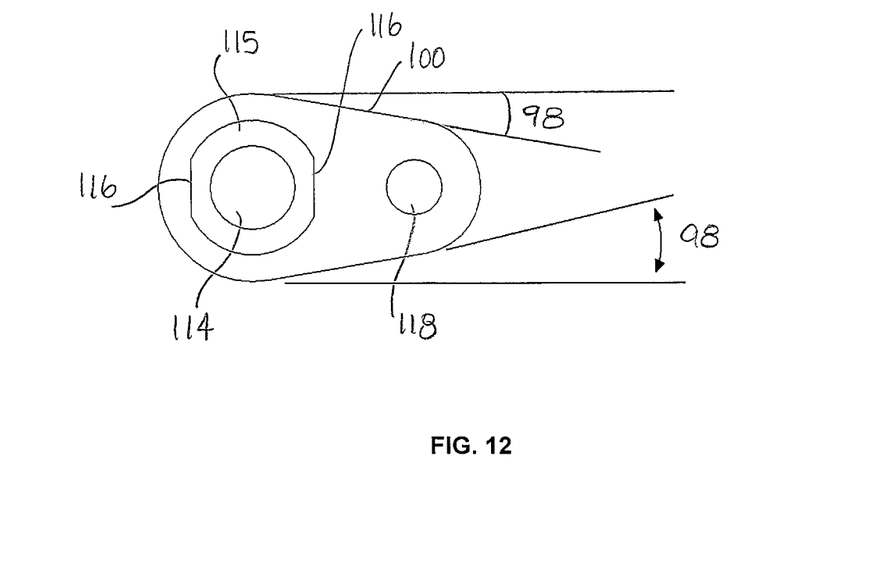
FIG. 12 is a front view of the adapter shown in FIG. 2.

As it can be seen in FIG. 12, the width of the adapter 100 on the side of the second opening 118 is smaller than the side of the first opening 114. The side surfaces of the adapter 100 have an angle 98. This particular configuration is to allow adjustment on the slide rail, more particularly when there are reinforcements on the slide rail.

In another embodiment, to prevent the ice-particle spray generating device to loosen during use, the thread direction of the ice-particle spray generating device is left handed on the left side of the vehicle and right handed on the right side of the vehicle.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. An ice-particle spray generating device for attachment to a snow vehicle, said ice-particle spray generating device comprising:
   a) an adapter comprising a first opening and a second opening;
   b) a resilient portion;
   c) a first end cap having a first and a second extremity, said second extremity being connected to a first end of said resilient portion, said first extremity of said first end cap being configured to permit threaded attachment to said snow vehicle, wherein said first extremity of said first end cap is received by said first opening;
   d) a second end cap connected to a second end of the resilient portion; and
   e) a wear point engaging the second end cap, said wear point adapted to frictionally engage the terrain to generate an ice spray during travel;
   wherein said adapter comprises a locking device to prevent rotation of said first end cap into said first opening.

2. The ice-particle spray generating device of claim 1, wherein said locking device comprises a first profile on said first opening configured to match a corresponding second profile on said first extremity of said first end cap.

3. The ice-particle spray generating device of claim 1, wherein said locking device comprises a flat portion on said first opening configured to match a flat portion on said first extremity of said first end cap.

4. The ice-particle spray generating device of claim 3, wherein said first opening further comprises a shoulder on which said first extremity of said first end cap abuts.

5. The ice-particle spray generating device of claim 1, wherein said locking device comprises spline extending in said first opening configured to matches spline on said first extremity of said first end cap.

6. The ice-particle spray generating device of claim 5, wherein said first opening further comprises a shoulder on which said first extremity of said first end cap abuts.

7. The ice-particle spray generating device of claim 1, wherein said locking device comprises at least one keyseat extending in said first opening configured to matches corresponding key on said first extremity of said first end cap.

8. The ice-particle spray generating device of claim 7, wherein said first opening further comprises a shoulder on which said first extremity of said first end cap abuts.

9. The ice-particle spray generating device of claim 1, wherein said locking device comprises conical spline extending in said first opening configured to matches conical spline on said first extremity of said first end cap.

10. The ice-particle spray generating device of claim 1, wherein said locking device comprises the welding of said first end cap to said adapter.

11. The ice-particle spray generating device of claim 1, wherein said threaded attachment for installation of the left side of said snow vehicle is left handed.

12. The ice-particle spray generating device of claim 1, wherein said threaded attachment for installation of the right side of said snow vehicle is right handed.

13. The ice-particle spray generating device of claim 1, wherein said wear point is replaceable.

14. An ice-particle spray generating device for attachment to a snow vehicle, said ice-particle spray generating device comprising:
   a) an adapter comprising a first opening and a second opening;
   b) a resilient portion;
   c) a first end cap having a first and a second extremity, said second extremity being connected to a first end of said resilient portion, said first extremity of said first end cap being configured to permit threaded attachment to said snow vehicle, and wherein said first extremity of said first end cap is received by said first opening;
   d) a locking device, wherein said locking device comprises a first profile on said first opening configured to match a corresponding second profile on said first extremity of said first end cap;
   e) a second end cap connected to a second end of the resilient portion; and f) a wear point engaging the second end cap, said wear point adapted to frictionally engage the terrain to generate an ice spray during travel;

wherein said adapter comprises said locking device to prevent rotation of said first end cap into said first opening.

15. An adapter for use with an ice-particle spray generating device for attachment to a snow vehicle, said ice-particle spray generating device comprising a resilient portion, a first end cap having a first and a second extremity, said second extremity of said first end cap being connected to a first end of said resilient portion, said first extremity of said first end cap being configured to permit threaded attachment to said snow vehicle, a second end cap connected to a second end of the resilient portion, a wear point engaging the second end cap, said wear point adapted to frictionally engage the terrain to generate an ice spray during travel, said adapter comprising:

a) a first opening, wherein said first extremity of said first end cap is received by said first opening;

b) a locking device, wherein said locking device comprises a first profile on said first opening configured to match a corresponding second profile on said first extremity of said first end cap to prevent rotation of said first end cap into said first opening.

* * * * *